US006465079B1

(12) United States Patent
Ebihara

(10) Patent No.: US 6,465,079 B1
(45) Date of Patent: Oct. 15, 2002

(54) THERMAL TRANSFER SHEET

(75) Inventor: Shunichi Ebihara, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 09/348,931

(22) Filed: Jul. 7, 1999

(30) Foreign Application Priority Data

Jul. 7, 1998 (JP) .......................................... 10-191805

(51) Int. Cl.[7] .................................................. B32B 3/00

(52) U.S. Cl. ...................... 428/195; 428/484; 428/500; 428/521; 347/217

(58) Field of Search ................................ 428/195, 484, 428/500, 913, 914, 521; 347/217

(56) References Cited

U.S. PATENT DOCUMENTS 5,219,610 A * 6/1993 Koshizuka et al. ......... 427/152

5,362,548 A * 11/1994 Hiyoshi et al. ............ 428/195

* cited by examiner

*Primary Examiner*—Bruce H. Hess
*Assistant Examiner*—Michael E. Grendzynski
(74) *Attorney, Agent, or Firm*—Ladas & Parry

(57) ABSTRACT

A thermal transfer sheet of the present invention comprises a substrate, a peeling layer and a colorant layer, the peeling layer and the colorant layer being disposed on one side of the substrate in this order when viewing from the substrate, wherein an applied amount of the peeling layer is in a range of 1.5 to 5.0 $g/m^2$, an applied amount of the colorant layer is not more than half the applied amount of the peeling layer, the peeling layer has a melt viscosity in a range of 10 to 300 cP at 100° C., and the colorant layer contains at least one thermoplastic resin selected from the group consisting of ethylene-acrylic acid copolymers(EAA), ionomer, styrene-butadiene rubbers(SBR), and nitrile-butadiene rubbers (NBR) at a proportion in a range of 10 to 60% by weight. The thermal transfer sheet can print an image having a quality appearance with no void and nick and an excellent wear resistance on a receiving sheet having a low smoothness, in particular a rough paper.

14 Claims, 1 Drawing Sheet

THERMAL TRANSFER SHEET

BACKGROUND OF THE INVENTION

1. Field of the Invention

The present invention relates to a thermal transfer sheet applicable to a thermal transfer printer using a heating means such as a thermal head, a laser or the like, particularly to a thermal transfer sheet capable of printing even a rough paper having a low smoothness with an image excellent in a sharpness eliminating voids and nicks and a wear resistance.

2. Description of the Related Art

A heat meltable type thermal transfer sheet is generally constituted of at least a substrate, a heat fusible ink layer and a heat resistance layer, in which a heat resistance layer is formed on one side of a substrate, and the mono-layered or multi-layered ink layer is formed on the other side of the substrate. Among methods using a thermal head with such a thermal transfer sheet, relatively major is a cold-peeled printing method, in which the ink layer is heated by the thermal head, the softened or molten ink is fixed on a receiving sheet, the fixed ink is left to be cooled, and thereafter the cooled thermal transfer sheet is peeled off the receiving sheet.

The heat meltable type thermal transfer method is desired to enable a good printing to a receiving sheet having a low smoothness. But when the rough receiving sheet is subjected to the cold-peeled printing method, it is difficult that concave portions of the rough surface is completely filled with the molten ink, thereby causing voids and nicks of the printed image. In order to attain this desire, there has been known a printing technique using one kind of the thermal heads, called as an "edge head" or "near-edge head", in which heating elements are disposed at an end portion or vicinity thereof on a surface of a support member of the thermal head.

Such an edge or near-edge head is applied to a hot-peeled printing method, in which the ink layer is heated by the thermal head, and simultaneously peeled off the receiving sheet while the ink layer is still soften or molten. A known thermal transfer sheet applicable to the hot-peeled printing method has a multi-layered ink layer which is constitute a peeling layer, a colorant layer and an adhesive layer laminated in this order.

When the hot-peeled printing method is carried out with the combination use of the above descried thermal transfer sheet and the edge or near-edge head, the thermal transfer sheet is peeled off the receiving sheet in a condition where the peeling layer and the adhesive layer are softened or molten respectively. Taking this mechanism into account, the thermal transfer sheet is designed so that a melt viscosity of the adhesive layer is made larger than that of the peeling layer, and thus peeling of the thermal transfer sheet is caused by cohesive failure of the peeling layer. The hot-peeled printing method can prevent voids and nicks of the printed image at the use of the receiving sheet having a low smoothness, even when the ink is not sufficiently infiltrated into the concave portion of the receiving sheet, because the peeling layer can cause cohesive failure as far as it has a sufficiently low melt viscosity to separate the colorant layer of a heated area from the substrate, and the separated colorant layer can be transferred on the concave portion to make a bridging structure over the concave portion.

However, the ink transferred in the bridging structure is in contact with only convex points of the rough surface of the receiving sheet, and it is not substantially fixed to the receiving sheet. Accordingly, a printed product obtained from the conventional hot-peeled printing method has been insufficient in a wear resistance, a scratch resistance and a plasticizer resistance of the printed image.

SUMMARY OF THE INVENTION

This invention has been achieved under these circumstances, and the object of this invention is to provide a thermal transfer sheet which can print an image having a quality appearance with no void and nick and an excellent wear resistance on a receiving sheet having a low smoothness, in particular a rough paper.

To attain this object, a thermal transfer sheet of the present invention comprises a substrate, a peeling layer and a colorant layer, the peeling layer and the colorant layer being disposed on one side of the substrate in this order when viewing from the substrate, wherein an applied amount of the peeling layer is in a range of 1.5 $g/m^2$ to 5.0 $g/m^2$, an applied amount of the colorant layer is not more than half the applied amount of the peeling layer, the peeling layer has a melt viscosity in a range of 10 cP to 300 cP at 100° C., and the colorant layer contains at least one thermoplastic resin selected from the group consisting of ethylene-acrylic acid copolymers, ionomer, styrene-butadiene rubbers, and nitrile-butadiene rubbers at a proportion in a range of 10 to 60% by weight.

In the thermal transfer sheet of the present invention, the colorant layer is laid on one surface of the substrate via at least the peeling layer, and an applied amount of the peeling layer is controlled within a range of 1.5 to 5.0 $g/m^2$, and further an applied amount of the colorant layer is controlled to half the applied amount of the peeling layer or less. When such a thermal transfer sheet as designed above is used to print on the rough paper or another rough receiving sheet, it is assumed that the peeling layer can push the colorant layer into the concave portions of the rough surface of the rough paper, and the peeling layer can also infiltrate into the rough paper through the colorant layer, thereby improving transferability.

The peeling layer causes cohesive failure itself at a printing process to be peeled off the substrate, and it is preferable to control a melt viscosity of the peeling layer so as to show 10 to 300 cP at 100° C.

Besides, in order to ensure a wear resistance and a scratch resistance for the image printed on the receiving sheet having a low smoothness such as the rough paper, it is preferable that the colorant layer is imparted with a good adhesive strength to the receiving sheet and a proper strength in film forming. When the colorant layer contains one or more kinds of thermoplastic resins selected among ethylene-acrylic acid copolymers (EAA), ionomer, styrene-butadiene rubbers (SBR), and nitrile-butadiene rubbers (NBR) at a proportion in a range of 10 to 60% by weight, the adhesive strength and the film strength of the colorant layer can be improved, and in addition the colorant layer can be also improved in fitness to the concave portion of the rough surface.

It is more preferable to control the melt viscosity of the peeling layer so as to show 20 to 150 cP at 100° C.

The colorant layer becomes particularly preferable when it contains at least one of the ethylene-acrylic acid copolymers and at least one of the styrene-butadiene rubbers at a total proportion in a range of 10 to 60% by weight. Among the styrene-butadiene rubbers, carboxy-modified styrene-butadiene rubber is particularly preferable, and more advantageous effect obtained by incorporating the carboxy-modified SBR into the colorant layer at a proportion in a range of 20 to 40% by weight.

DETAILED DESCRIPTION OF THE PREFERRED EMBODIMENTS

Figure 1:
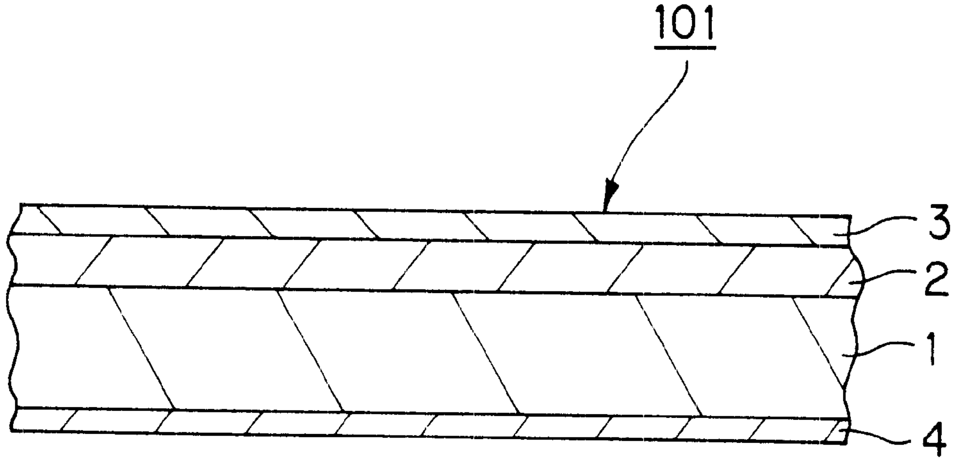
FIG. 1 is a sectional view showing one example of the thermal transfer sheet of the present invention.

FIG. 1 is a sectional view showing one example(101) of the thermal transfer sheet of the present invention. In FIG. 1, the thermal transfer sheet 101 has a substrate 1, and a peeling layer 2 and a colorant layer 3 are laminated on one side of the substrate in this order from a position of the substrate, and a back surface layer 4 is laminated on the other side of the substrate.

In the present invention, the peeling layer and the colorant layer are essential. An applied amount of the peeling layer is set within a range of not less than 1.5 g/$m^2$ and not more than 5.0 g/$m^2$. The peeling layer is controlled so as to show a melt viscosity in a range of not less than 10 cP (centipoise) and not more than 300 cP at 100° C. On the other hand, an applied amount of the colorant layer is set so as to be not more than half the applied amount of the peeling layer. The colorant layer contains at least one thermoplastic resin selected among ethylene-acrylic acid copolymers, ionomer, styrene-butadiene rubbers and nitrile-butadiene rubbers, and a total amount of these selected resins is controlled in a range of not less than 10% and not more than 60% by weight based on a weight of the colorant layer.

The peeling layer and the colorant layer may be laminated on one area of the substrate. A layered structure having the peeling layer and the colorant layer may provided with the other layers as far as the peeling layer and the colorant layer are disposed on one side of the substrate in this order when viewing from the substrate. For example, a primer layer may be formed between the substrate and the peeling layer, or an intermediate layer may be formed between the peeling layer and the colorant layer as required.

The back surface layer is not essential for the present invention, but it may be formed on a surface opposite to that provided with the peeling layer and the colorant layer in order to prevent thermal fusion (sticking) to the thermal head and improve a slipping ability.

(SUBSTRATE)

Materials of the substrate is not restricted as far as it has a certain strength and heat resistance, and those used in the conventional thermal transfer sheet may also be used for the present invention.

Preferable examples of the substrate include: plastics such as polyester, polypropylene, cellophane, polycarbonate, cellulose acetate, polyethylene, polyvinyl chloride, polystyrene, nylon, polyimide, polyvinylidene chloride, polyvinyl alcohol, fluoro resin, chlorinated rubber, ionomer or the like; papers such as condenser paper, paraffin paper or the like; nonwoven fabric; and composite materials formed by mixing or laminating these simple materials.

Thickness of the substrate can be changed depending on a used material to control strength and thermal conductivity within a proper range, and a preferable thickness of the substrate is usually in a range of about 2 to 25 μm.

(PEELING LAYER)

The peeling layer is formed between the substrate and the colorant layer. When thermal printing is carried out, the peeling layer is soften or molten by heating energy of the thermal head to cause cohesive failure itself, thereby separating the colorant layer of the heated area from the substrate. The thus separated colorant layer is easily transferred to the receiving sheet, even if the receiving sheet has a rough surface.

Materials composing the peeling layer is not particularly restricted. The peeling layer may be composed of wax, thermoplastic resin or a mixture thereof, and it may be incorporated with additives such as an organic or inorganic filler as required.

For example, microcrystalline wax, carnauba wax and paraffin wax are usable for forming the peeling layer. Examples of the wax forming the peeling layer may further include Fischer-Tropsch wax, low molecular polyethylenes having various molecular weights, Japan tallow, bees wax, spermaceti, insect wax, wool wax, shellac wax, candelilla wax, petrolatum, polyester wax, partially modified wax, fatty acid ester, fatty acid amide or the like. Among these waxes, one having a melting point in a range of 50 to 85° C. is preferable. A melting point lower than 50° C. may cause a problem in preservability, and a melting point higher than 85° C. may cause deficiency of printing sensitivity.

Examples of the thermoplastic resin usable for the peeling layer include cellulose resins, melamine resins, polyester resins, polyamide resins, polyolefine resins, acrylic resins, styrene resins, ethylene-vinyl acetate copolymers, and thermoplastic elastomer such as styrene-butadiene rubbers. Among the thermoplastic resins, preferable is such one having a relatively low softening point as conventionally used as a thermally sensitive adhesive, for example that having a softening point in a range of 50 to 80° C.

Examples of the organic filler usable as the additive for the peeling layer include acrylic fillers, polyamide fillers, fluoro-fillers, polyethylene waxes or the like. As to the inorganic filler, there may be exemplified talc, kaolin, clay, calcium carbonate, magnesium hydroxide, magnesium carbonate, magnesium oxide, silica or the like.

The peeling layer is composed of such materials as described above, and a preferable range of melt viscosity showed when the peeling layer is heated at 100° C. is not less than 10 cP and not more than 300 cP, and more preferably, not less than 20 cP and not more than 150 cP.

When the melt viscosity is excessively low, the peeling layer is fused and mixed with the colorant layer at a printing operation to be flowed, thus causing unevenness of the printing density and deterioration of the effect to push the colorant layer into the concave portion of the receiving sheet. On the other hand, when the melt viscosity is excessively high, occurrence of the cohesive failure of the peeling layer is restrained at a printing operation, thus causing the voids and nicks of the printed image and obstruction of printing.

The peeling layer may be formed by dissolving and/or dispersing materials of the peeling layer in a proper solvent to prepare a coating solution for peeling layer, applying it on the substrate by a proper technique, for example, hot melt coating, hot lacquer coating, gravure direct coating, gravure reverse coating, knife coating, air coating, roll coating, die coating or the like.

It is preferable to control an applied amount of the peeling layer to not less than 1.5 g/$m^2$ and not more than 5.0 g/$m^2$ in a dried state. When an applied amount of the peeling layer is smaller than 1.5 g/$m^2$, a force to push the colorant layer into the concave portion of the receiving sheet may become insufficient. On the other hand, when an applied amount of the peeling layer is larger than 5.0 g/$m^2$, heating of the colorant layer may becomes insufficient because the peeling layer absorbs a considerable heating energy which is applied for printing, thus resulting in a short adhesive strength of the colorant layer to the receiving sheet.

(COLORANT LAYER)

The peeling layer may be composed of a colorant such as die and pigment conventionally known, a wax, a thermoplastic resin and an organic or inorganic filler, and it may be incorporated with additives such as a surface active agent, an antistatic agent and a dispersant as required.

The colorant may take any color such as yellow, magenta, cyan or black, and it is possible for the present invention to select a properly colorant among conventional carbon black, various organic or inorganic pigments and dies or the like.

The wax may be incorporated into the colorant layer as far as it does not deteriorate heat resistance of the colorant layer. For example, microcrystalline wax, carnauba wax and paraffin wax are usable for forming the colorant layer. Examples of the wax forming the colorant layer may further include Fischer-Tropsch wax, low molecular polyethylenes having various molecular weight, Japan tallow, bees wax, spermaceti, insect wax, wool wax, shellac wax, candelilla wax, petrolatum, polyester wax, partially modified wax, fatty acid ester, fatty acid amide or the like. Among these waxes, one having a melting point in a range of 50 to 85° C. is preferable. A melting point lower than 50° C. may cause a problem in preservability, and a melting point higher than 85° C. may cause deficiency of printing sensitivity.

Examples of the thermoplastic resin usable for the colorant layer include cellulose resins, melamine resins, polyester resins, polyamide resins, polyolefine resins, acrylic resins, styrene resins, ethylene-vinyl acetate copolymers, and thermoplastic elastomer such as styrene-butadiene rubbers.

In order to ensure a wear resistance and a scratch resistance for the printed image when a receiving sheet such as a rough paper is subjected to a printing process, it is preferable that the colorant layer is imparted with a good adhesive strength to the receiving sheet and a proper strength in film forming by selecting one or more kinds of thermoplastic resins among ethylene-acrylic acid copolymers (EAA), ionomer, styrene-butadiene rubbers (SBR), and nitrile-butadiene rubbers (NBR), and incorporating the selected resins into the colorant layer at a total proportion in a range of not less than 10% and not more than 60% by weight. These thermoplastic resins include their modified products, such as carboxy-modified SBR, carboxy-modified NBR or the like. The use of such- kind and such amount of the thermoplastic resin can also improve the colorant layer in fitness to the concave points of the rough surface.

That is, it is preferable that the colorant layer shows a high melt viscosity and keeps a proper film strength in comparison with the peeling layer when the colorant layer and the peeling layer are heated by the thermal head. The above exemplified thermoplastic resins have a proper strength when formed into a film, and they also have a good fitness to irregularities of the surface of the receiving sheet when they used for forming the colorant layer. However, when a total amount of these resins is smaller than 10% by weight, a thermal flowability of the colorant layer is raised, and an ink of the colorant layer may flow down from the convex portion to the concave portion of the receiving sheet, thereby lowering printing density of the convex portion. In addition, a small amount of the these resins may make a film strength of the colorant layer excessively weak to break its film structure in a process where the colorant layer is pushed into the concave portion, thereby causing the void and nick. On the other hand, when a total amount of these resins is larger than 60% by weight, a film strength of the colorant layer may go excessively strong to deteriorate the colorant layer in sharpness of a boundary where transfer of the colorant layer is stopped (sharpness of transfer-stop) and also deteriorate in fitness to the concave portion, thereby forming a printed image with a bridging structure.

The colorant layer becomes particularly preferable when it contains at least one of the ethylene-acrylic acid copolymers and at least one of the styrene-butadiene rubbers in combination. Among the styrene-butadiene rubbers, carboxy-modified styrene-butadiene rubber(C-Mod SBR) is particularly preferable, and more advantageous effect is obtained by incorporating the carboxy-modified SBR into the colorant layer at a proportion in a range of not less than 20% and not more than 40% by weight.

It is preferable that the colorant layer is formed with the use of an ink composition containing the colorant at a proportion in a range of 90 to 20% by weight and a binder at a proportion in a range of 80 to 10% by weight.

When a proportion of the colorant is smaller than the range described above, it may be necessary for the printing density to increase an applied amount of the ink composition, and printing sensitivity is liable to become deficient. On the other hand, when a proportion of the colorant is larger than the range described above, it may be failed to ensure a sufficient film-forming property, thereby deteriorating wear resistance of the printed product.

The colorant layer may be formed by mixing the colorant, the binder and additives, further mixing solvent such as water or an organic solvent as required to prepare a coating solution for colorant layer, applying it on the peeling layer by a proper technique, for example, hot melt coating, hot lacquer coating, gravure direct coating, gravure reverse coating, knife coating, air coating, roll coating, die coating or the like.

An applied amount of the colorant layer is controlled to an extent not more than half the applied amount of the peeling layer. The minimum effective amount of the colorant layer is defined depending on various conditions, and it is preferable to set an applied amount of the colorant layer so as to be not less than one twentieth of the applied amount of the peeling layer.

When a difference of melt viscosity between the peeling layer and the colorant layer is small, the colorant layer which has an applied amount more than half the peeling layer causes cohesive failure itself at the time of peeling, thus resulting in a low printing density. When a melt viscosity of the peeling layer is made sufficiently smaller than that of the colorant layer, the melt viscosity of the colorant layer is therefore large, but the colorant layer which has an applied amount more than half the peeling layer can not fit to the concave portion of the receiving sheet to form the bridging structure, and alternatively this colorant layer is involved in deficiency of printing sensitivity to obstruct its transfer. On the other hand, when an applied amount of the colorant layer is smaller than one twentieth of the peeling layer, the printing density may become insufficient.

Accordingly, when an applied amount of the peeling layer is set within a range of 1.5 g/m$^2$ to 5.0 g/m$^2$, and an applied amount of the colorant layer is controlled to not more than half the applied amount of the peeling layer, and further printing is carried out by means of the edge head or near-edge head, a receiving sheet having a low smoothness can be printed with an image excellent in a wear resistance, a scratch resistance, a resistance to peeling action using an adhesive tape, a plasticizer resistance or the like.

(BACK SURFACE LAYER)

The back surface layer may be formed on a surface of the substrate opposite to that on which the peeling layer and the colorant layer are formed, and the back surface layer can prevent sticking of the thermal head and improve slipping ability of the back surface.

The back surface layer may be formed of a binder resin, and it may be incorporated with the other material such as slipping agent, surface active agent, inorganic particles, organic particles, pigment or the like.

Examples of the binder resin usable for the back surface layer include: cellulose resins such as ethyl cellulose, hydroxyethyl cellulose, hydroxypropyl cellulose, methyl cellulose, cellulose acetate, cellulose acetate butyrate, nitrocellulose or the like; vinyl resins such as polyvinyl alcohol, polyvinyl acetate, polyvinyl butyral, polyvinyl acetal, polyvinyl pyrrolidone, acrylic resin, polyacrylamide, acrylonitrile-styrene copolymer or the like; polyester resins; polyurethane resins; and silicone- or fluorine-modified urethane resins.

It is preferable to use a cross linking resin as the binder resin of the back surface layer, which may be obtainable by the combination use of a substance which has a molecular structure containing several reactive moieties such as hydroxyl and a cross linking agent such as polyisocyanate.

The back surface layer may be formed by mixing the binder resin with the other materials such as slipping agent, surface active agent, inorganic particles organic particles, pigment or the like, dissolving or dispersing the thus obtained mixture in a proper solvent to prepare a coating solution, applying it on the back surface of the substrate by a known means such as a gravure coater, a roll coater or a wire bar coater, and then drying.

As apparent from the above description, when the thermal transfer sheet of the present invention is used to carry out the hot-peeled printing method, the voids and nicks of the printed image can be prevented from occurring, and thus an image excellent in sharpness and wear resistance can be formed on a surface of the receiving sheet having a low smoothness such as a rough paper. It is preferable to carry out the hot-peeled printing method by means of the edge head or the near-edge head as the thermal head.

In the thermal transfer sheet of the present invention, the colorant layer is laid on one surface of the substrate via at least the peeling layer, and an applied amount of the peeling layer is controlled within a range of 1.5 to 5.0 g/m$^2$, and further an applied amount of the colorant layer is controlled to not more than half the applied amount of the peeling layer. When such a thermal transfer sheet as designed above is used to print on the rough paper or another rough receiving sheet, it is assumed that the peeling layer can push the colorant layer into the concave portions(points) of the rough surface of the rough paper, and the peeling layer can also infiltrate into the rough paper through the colorant layer, thereby improving transferability.

The peeling layer causes cohesive failure itself at a printing process to be peeled off the substrate, and it is preferable to control a melt viscosity of the peeling layer so as to show 10 to 300 cP at 100° C.

Besides, in order to ensure a wear resistance and a scratch resistance for the image printed on the receiving sheet having a low smoothness such as the rough paper, it is preferable that the colorant layer is imparted with a good adhesive strength to the receiving sheet and a proper strength in film forming. When the colorant layer contains one or more kinds of thermoplastic resins selected among ethylene-acrylic acid copolymers (EAA), ionomer, styrene-butadiene rubbers (SBR), and nitrile-butadiene rubbers (NBR) at a total proportion in a range of 10 to 60% by weight, the adhesive strength and the film strength of the colorant layer can be improved, and in addition the colorant layer can be also improved in fitness to the concave portion of the rough surface.

EXAMPLE

Hereinafter, the present invention is described in more detail by reference to the experimental examples. In the following examples, "part(s)" and "%" are expressed by weight except the case indicating a specific notes individually.

Example 1

A polyethylene terephthalate film (LUMIRROR, available from Toray Co., Ltd.) with a thickness of 4.5 μm was taken as the substrate. A coating solution for back surface layer having the following composition was applied on one surface of the substrate at an applied amount of 0.3 g/m$^2$ in a solid component by means of a gravure coater, and then dried the same to form a back surface layer.

Next, a coating solution for peeling layer having the following composition was applied on the other surface of the substrate at an applied amount of 4.5 g/m$^2$ in a solid component by hot melt coating, and then dried the same to form a peeling layer. Further, a coating solution for colorant layer having the following composition was applied on the peeling layer at an applied amount of 0.3 g/m$^2$ in a solid component by means of a gravure coater, and then dried the same to form a colorant layer, thus obtaining a thermal transfer sheet.

<Coating Solution for Back Surface Layer>

Styrene-Acrylonitrile copolymer resin: 11 parts by weight

Linear saturated polyester resin: 0.3 parts by weight

Zinc stearyl phosphate: 6 parts by weight

Melamine resin powder: 3 parts by weight

Methyl ethyl ketone: 80 parts by weight

<Coating Solution for Peeling Layer>

155° F. paraffin wax: 3 parts by weight

Carnauba wax No. 2: 7 parts by weight (Notes) A melt viscosity of a peeling layer from this solution was about 15 cP at 100° C.

<Coating Solution for Colorant Layer>

Carbon black emulsion (SP BLACK 8556, available from Fuji Shikiso Corporation, 40% of solid component): 5 parts by weight Ionomer emulsion (CHEMIPERL S-300, available from Mitsui Petrochemical Co., Ltd., 35% of solid component): 2 parts by weight Emulsion (30% of solid component, a trial product) using ethylene-vinyl acetate copolymer(EVA) (EVAFLEX 250, available from Mitsui Polychemical Co., Ltd.): 4 parts by weight

Example 2

A thermal transfer sheet was formed in the same manner as that of the Example 1, except that compositions for the peeling layer and the colorant layer were changed to the following compositions respectively, and the coating solution for peeling layer was applied at an applied amount of 3.0 g/m$^2$ in a solid component, and the coating solution for colorant layer was applied at an applied amount of 1.0 g/m$^2$ in a solid component.

<Coating Solution for Peeling Layer>

160° F. paraffin wax: 10 parts by weight

EVA (MB-080, available from Nihon Unicar Corporation): 0.1 parts by weight (Notes) A melt viscosity of a peeling layer from this solution was about 30 cP at 100° C.

<Coating Solution for Colorant Layer>

3 parts of carbon black was dispersed in 4 parts of an ethylene-acrylic acid copolymer(EAA) emulsion (15,000 of molecular weight, 25% of solid component). Next, 3 parts of the prepared dispersion was mixed with 2 parts of a carboxy-modified nitrile-butadiene rubber (carboxy-modified NBR) latex (NIPOL 1571, available from Nihon Zeon Corporation, 40% of solid component) and 1 part of an emulsion (30% of solid component, a trial product) using ethylene-vinyl acetate copolymer(EVA) (EVAFLEX 220, available from Mitsui Polychemical Co., Ltd.) to prepare a coating solution.

Example 3

A thermal transfer sheet was formed in the same manner as that of the Example 1, except that compositions for the peeling layer and the colorant layer were changed to the following compositions respectively, and the coating solution for peeling layer was applied at an applied amount of 3.0 g/m$^2$ in a solid component, and the coating solution for colorant layer was applied at an applied amount of 1.0 g/m$^2$ in a solid component.

<Coating Solution for Peeling Layer>

160° F. paraffin wax: 10 parts by weight

EVA (MB-080, available from Nihon Unicar Corporation): 1 part by weight (Notes) A melt viscosity of a peeling layer from this solution was about 100 cP at 100° C.

<Coating Solution for Colorant Layer>

3 parts of carbon black was dispersed in 4 parts of an ethylene-acrylic acid copolymer(EAA) emulsion (15,000 of molecular weight, 25% of solid component). Next, 3 parts of the prepared dispersion was mixed with 4 parts of a styrene-butadiene rubber (SBR) latex (NIPOL LX 112, available from Nihon Zeon Corporation, 40% of solid component) and 1 part of an emulsion (30% of solid component, a trial product) using ethylene-vinyl acetate copolymer(EVA) (EVAFLEX 220, available from Mitsui Polychemical Co., Ltd.) to prepare a coating solution.

Example 4

A thermal transfer sheet was formed in the same manner as that of the Example 1, except that compositions for the peeling layer and the colorant layer were changed to the following compositions respectively, and the coating solution for peeling layer was applied at an applied amount of 3.0 g/m$^2$ in a solid component, and the coating solution for colorant layer was applied at an applied amount of 1.0 g/m$^2$ in a solid component.

<Coating Solution for Peeling Layer>

160° F. paraffin wax: 10 parts by weight

EVA (MB-080, available from Nihon Unicar Corporation): 1 part by weight (Notes) A melt viscosity of a peeling layer from this solution was about 100 cP at 100° C.

<Coating Solution for Colorant Layer>

3 parts of carbon black was dispersed in 4 parts of an ethylene-acrylic acid copolymer(EAA) emulsion (15,000 of molecular weight, 25% of solid component). Next, 3 parts of the prepared dispersion was mixed with 1 part of a carboxy-modified styrene-butadiene rubber (carboxy-modified SBR) latex (NIPOL LX 430, available from Nihon Zeon Corporation, 50% of solid component) and 5 parts of an emulsion (30% of solid component, a trial product) using ethylene-vinyl acetate copolymer(EVA) (EVAFLEX 220, available from Mitsui Polychemical Co., Ltd.) to prepare a coating solution.

Example 5

A thermal transfer sheet was formed in the same manner as that of the Example 1, except that compositions for the peeling layer and the colorant layer were changed to the following compositions respectively, and the coating solution for peeling layer was applied at an applied amount of 3.0 g/m$^2$ in a solid component, and the coating solution for colorant layer was applied at an applied amount of 1.0 g/m$^2$ in a solid component.

<Coating Solution for Peeling Layer>

160° F. paraffin wax: 8 parts by weight

Carnauba wax No. 2: 2 parts by weight

EVA (28% of weight proportion of vinyl acetate substance (VA), 2500 of melt index(MI)): 1 part by weight (Notes) A melt viscosity of a peeling layer from this solution was about 100 cP at 100° C.

<Coating Solution for Colorant Layer>

3 parts of carbon black was dispersed in 4 parts of an ethylene-acrylic acid copolymer(EAA) emulsion (5,000 of molecular weight, 25% of solid component). Next, 3 parts of the prepared dispersion was mixed with 1 part of a carboxy-modified styrene-butadiene rubber (carboxy-modified SBR) latex (NIPOL LX 472, available from Nihon Zeon Corporation, 50% of solid component) and 2 parts of an emulsion (30% of solid component, a trial product) using ethylene-vinyl acetate copolymer(EVA) (EVAFLEX 220, available from Mitsui Polychemical Co., Ltd.) to prepare a coating solution.

Example 6

A thermal transfer sheet was formed in the same manner as that of the Example 1, except that compositions for the peeling layer and the colorant layer were changed to the following compositions respectively, and the coating solution for peeling layer was applied at an applied amount of 3.0 g/m$^2$ in a solid component, and the coating solution for colorant layer was applied at an applied amount of 1.0 g/m$^2$ in a solid component.

<Coating Solution for Peeling Layer>

160° F. paraffin wax: 8 parts by weight

Carnauba wax No. 2: 2 parts by weight

EVA (28% of VA, 2500 of MI): 1 part by weight (Notes) A melt viscosity of a peeling layer from this solution was about 100 cP at 100° C.

<Coating Solution for Colorant Layer>

3 parts of carbon black was dispersed in 4 parts of an ethylene-acrylic acid copolymer(EAA) emulsion (5,000 of molecular weight, 25% of solid component). Next, 3 parts of the prepared dispersion was mixed with 1 part of a carboxy-modified styrene-butadiene rubber (carboxy-modified SBR) latex (NIPOL LX 472, available from Nihon Zeon Corporation, 50% of solid component) and 1 part of an emulsion (30% of solid component, a trial product) using ethylene-vinyl acetate copolymer(EVA) (EVAFLEX 220, available from Mitsui Polychemical Co., Ltd.) to prepare a coating solution.

Example 7

A thermal transfer sheet was formed in the same manner as that of the Example 1, except that compositions for the peeling layer and the colorant layer were changed to the following compositions respectively, and the coating solution for peeling layer was applied at an applied amount of 3.0 g/m$^2$ in a solid component, and the coating solution for colorant layer was applied at an applied amount of 1.0 g/m$^2$ in a solid component.

<Coating Solution for Peeling Layer>

160° F. paraffin wax: 8 parts by weight

Carnauba wax No. 2: 2 parts by weight

EVA (28% of VA, 2500 of MI): 1 part by weight (Notes) A melt viscosity of a peeling layer from this solution was about 100 cP at 100° C.

<Coating Solution for Colorant Layer>

3 parts of carbon black was dispersed in 4 parts of an ethylene-acrylic acid copolymer(EAA) emulsion (5,000 of molecular weight, 25% of solid component). Next, 3 parts of the prepared dispersion was mixed with 2 parts of a carboxy-modified styrene-butadiene rubber (carboxy-modified SBR) latex (NIPOL LX 2570X5, available from Nihon Zeon Corporation, 40% of solid component) and 1 part of an emulsion (30% of solid component, a trial product) using ethylene-vinyl acetate copolymer(EVA) (EVAFLEX 220, available from Mitsui Polychemical Co., Ltd.) to prepare a coating solution.

Comparison Example 1

A polyethylene terephthalate film (LUMIRROR, available from Toray Co., Ltd.) with a thickness of 4.5 $\mu$m was taken as the substrate. A coating solution for back surface layer having the following composition was applied on one surface of the substrate at an applied amount of 0.3 g/m$^2$ in a solid component by means of a gravure coater, and then dried the same to form a back surface layer.

Next, a coating solution for peeling layer having the following composition was applied on the other surface of the substrate at an applied amount of 1.0 g/m$^2$ in a solid component by means of a gravure coater, and then dried the same to form a peeling layer. Further, a coating solution for colorant layer having the following composition was applied on the peeling layer at an applied amount of 2.0 g/m$^2$ in a solid component by means of a gravure coater, and then dried the same to form a colorant layer, thus obtaining a thermal transfer sheet.

<Coating Solution for Back Surface Layer>

Styrene-Acrylonitrile copolymer resin: 11 parts by weight

Linear saturated polyester resin: 0.3 parts by weight

Zinc stearyl phosphate: 6 parts by weight

Melamine resin powder: 3 parts by weight

Methyl ethyl ketone: 80 parts by weight

<Coating Solution for Peeling Layer>

145° F. paraffin wax emulsion (40% of solid component): 9 parts by weight

Carnauba wax No. 2 emulsion (40% of solid component): 1 part by weight (Notes) A melt viscosity of a peeling layer from this solution was about 5 cP at 100° C.

<Coating Solution for Colorant Layer>

3 parts of carbon black was dispersed in 4 parts of an ethylene-acrylic acid copolymer(EAA) emulsion (15,000 of molecular weight, 25% of solid component). Next, 3 parts of the prepared dispersion was mixed with 1 part of an ethylene-acrylic acid copolymer(EAA) emulsion (HITEC S-3121, available from Toho Kagaku Corporation, 25% of solid component) and 1 part of an emulsion (30% of solid component, a trial product) using ethylene-vinyl acetate copolymer(EVA) (EVAFLEX 220, available from Mitsui Polychemical Co., Ltd.) to prepare a coating solution.

Comparison Example 2

A thermal transfer sheet was formed in the same manner as that of the Example 1, except that compositions for the peeling layer and the colorant layer were changed to the following compositions respectively, and the coating solution for peeling layer was applied at an applied amount of 6.0 g/m$^2$ in a solid component by hot melt coating, and the coating solution for colorant layer was applied at an applied amount of 1.0 g/m$^2$ in a solid component.

<Coating Solution for Peeling Layer>

160° F. paraffin wax: 9 parts by weight

EVA (28% of VA, 2500 of MI): 3 parts by weight (Notes) A melt viscosity of a peeling layer from this solution was about 400 cP at 100° C.

<Coating Solution for Colorant Layer>

3 parts of carbon black was dispersed in 4 parts of an ethylene-acrylic acid copolymer(EAA) emulsion (15,000 of molecular weight, 25% of solid component). Next, 3 parts of the prepared dispersion was mixed with 2 parts of an ionomer emulsion (CHEMIPERL S-300, available from Mitsui Petrochemical Co., Ltd., 35% of solid component) and 1 part of an emulsion (30% of solid component, a trial product) using ethylene-vinyl acetate copolymer(EVA) (EVAFLEX 220, available from Mitsui Polychemical Co., Ltd.) to prepare a coating solution.

Comparison Example 3

A thermal transfer sheet was formed in the same manner as that of the Example 1, except that compositions for the peeling layer and the colorant layer were changed to the following compositions respectively, and the coating solution for peeling layer was applied at an applied amount of 3.0 g/m$^2$ in a solid component by hot melt coating, and the coating solution for colorant layer was applied at an applied amount of 0.1 g/m$^2$ in a solid component.

<Coating Solution for Peeling Layer>

160° F. paraffin wax: 9 parts by weight

EVA (28% of VA, 2500 of MI): 3 parts by weight (Notes) A melt viscosity of a peeling layer from this solution was about 400 cP at 100° C.

<Coating Solution for Colorant Layer>

3 parts of carbon black was dispersed in 4 parts of an ethylene-acrylic acid copolymer(EAA) emulsion (15,000 of molecular weight, 25% of solid component). Next, 3 parts of the prepared dispersion was mixed with 2 parts of an ionomer emulsion (CHEMIPERL S-300, available from Mitsui Petrochemical Co., Ltd., 35% of solid component) and 1 part of an emulsion (30% of solid component, a trial product) using ethylene-vinyl acetate copolymer(EVA) (EVAELEX 220, available from Mitsui Polychemical Co., Ltd.) to prepare a coating solution.

Comparison Example 4

A polyethylene terephthalate film (LUMIRROR, available from Toray Co., Ltd.) with a thickness of 4.5 $\mu$m was taken as the substrate. A coating solution for back surface layer having the following composition was applied on one surface of the substrate at an applied amount of 0.3 g/m$^2$ in a solid component by means of a gravure coater, and then dried the same to form a back surface layer.

Next, a coating solution for peeling layer having the following composition was applied on the other surface of the substrate at an applied amount of 2.0 g/$m^2$ in a solid component by means of a gravure coater, and then dried the same to form a peeling layer. Further, a coating solution for colorant layer having the following composition was applied on the peeling layer at an applied amount of 2.0 g/$m^2$ in a solid component by means of a gravure coater, and then dried the same to form a colorant layer, thus obtaining a thermal transfer sheet.

<Coating Solution for Back Surface Layer>

Styrene-Acrylonitrile copolymer resin: 11 parts by weight

Linear saturated polyester resin: 0.3 parts by weight

Zinc stearyl phosphate: 6 parts by weight

Melamine resin powder: 3 parts by weight

Methyl ethyl ketone: 80 parts by weight

<Coating Solution for Peeling Layer>

145° F. paraffin wax emulsion (40% of solid component): 9 parts by weight

Carnauba wax No. 2 emulsion (40% of solid component): 1 part by weight (Notes) A melt viscosity of a peeling layer from this solution was about 5 cP at 100° C.

<Coating Solution for Colorant Layer>

3 parts of carbon black was dispersed in 4 parts of an ethylene-acrylic acid copolymer(EAA) emulsion (15,000 of molecular weight, 25% of solid component). Next, 3 parts of the prepared dispersion was mixed with 9 parts of an emulsion (30% of solid component, a trial product) using ethylene-vinyl acetate copolymer(EVA) (EVAFLEX 250, available from Mitsui Polychemical Co., Ltd.) to prepare a coating solution.

Comparison Example 5

A thermal transfer sheet was formed in the same manner as that of the Comparison Example 4, except that compositions for the peeling layer and the colorant layer were changed to the following compositions respectively, and the coating solution for peeling layer was applied at an applied amount of 3.0 g/$m^2$ in a solid component by hot melt coating, and the coating solution for colorant layer was applied at an applied amount of 1.0 g/$m^2$ in a solid component.

<Coating Solution for Peeling Layer>

160° F. paraffin wax: 10 parts by weight

EVA (28% of VA, 2500 of MI): 2 parts by weight (Notes) A melt viscosity of a peeling layer from this solution was about 250 cP at 100° C.

<Coating Solution for Colorant Layer>

Carbon black emulsion (SP BLACK 8556, available from Fuji Shikiso Corporation, 25% of solid component): 1 part by weight Emulsion (30% of solid component, a trial product) using ethylene-vinyl acetate copolymer(EVA) (EVAFLEX 420, available from Mitsui Polychemical Co., Ltd.): 1 part by weight

Comparison Example 6

A thermal transfer sheet was formed in the same manner as that of the Comparison Example 4, except that compositions for the peeling layer and the colorant layer were changed to the following compositions respectively, and the coating solution for peeling layer was applied at an applied amount of 3.0 g/$m^2$ in a solid component by hot melt coating, and the coating solution for colorant layer was applied at an applied amount of 1.0 g/$m^2$ in a solid component.

<Coating Solution for Peeling Layer>

160° F. paraffin wax: 9 parts by weight

EVA (28% of VA, 2500 of MI): 3 parts by weight (Notes) A melt viscosity of a peeling layer from this solution was about 400 cP at 100° C.

<Coating Solution for Colorant Layer>

Carbon black emulsion (SP BLACK 8556, available from Fuji Shikiso Corporation, 25% of solid component): 1 part by weight Polyester emulsion (VYLONAL MD 1930, available from Toyo Boseki Co., Ltd., 30% of solid component): 1 part by weight

Test and Result (Test)

A thermal transfer sheets obtained in the above described experimental examples were used for printing in the following condition, and then the printed products thus obtained were evaluated in transferability, extent of the voids, printing density, sharpness of a boundary where transfer of the colorant layer is stopped (sharpness of transfer-stop), unevenness of printing density and wear resistance.

<Printing Condition>

A paper of No.4024 (available from Zerox Corporation) was used as the receiving sheet and that paper was printed with solid patterns and letters(characters) by thermal transfer printing with the use of the each thermal transfer sheet of the experimental examples and Label Printer B472 (available from TEC corporation).

(1) Criteria for Transferability

The printed samples thus obtained were observed by the naked eyes to check whether shapes (outlines) of the solid patterns and the letters were sharp or not, and then relatively evaluated in accordance with the following criteria.

◎: The shapes of the solid patterns and the letters were very sharp, and therefore excellent.

○: The shapes of the solid patterns and the letters were relatively sharp, and therefore good.

Δ: Though the shapes of the solid patterns and the letters had a little unclear parts, they could be evaluated as almost good.

x: The shapes of the solid patterns and the letters had many unclear parts, and therefore bad.

(2) Criteria for Voids

The printed samples thus obtained were observed by the naked eyes to check whether the voids occurred at center portions of the solid patterns or not, and then relatively evaluated in accordance with the following criteria.

◎: The voids were not observed at all, and therefore excellent.

○: Almost no voids were observed, and therefore good.

Δ: Though voids were observed a little, the sample could be evaluated as almost good.

x: The voids were conspicuously observed, and therefore bad.

(3) Criteria for Printing Density

Reflection densities of the solid patterns were measured with respect to the printed samples, and then relatively evaluated in accordance with the following criteria.

◎: The density was very high, and therefore excellent.

○: The density was high, and therefore good.

Δ: Though the density was a little low, it could be evaluated as almost good.

x: The density was very low, and therefore bad.

(4) Criteria for Sharpness of Transfer-stop

The printed samples thus obtained were observed by the naked eyes to check reproducibility for details of the printed letters, and then relatively evaluated in accordance with the following criteria.

◎: The reproducibility for details of the printed letters was very high, and therefore excellent.

○: The reproducibility for details of the printed letters was high, and therefore good.

Δ: Though the reproducibility for details of the printed letters was a little inferior, it could be evaluated as almost good.

x: The reproducibility for details of the printed letters was very inferior, and therefore bad.

(5) Criteria for Unevenness of Printing Density

The printed samples thus obtained were observed by the naked eyes to check evenness in density of the solid patterns, and then relatively evaluated in accordance with the following criteria.

◎: The solid patterns had a very high evenness in density, and therefore excellent.

○: The solid patterns had a high evenness in density, and therefore good.

Δ: Though the solid patterns had a little inferior evenness in density, they could be evaluated as almost good.

x: The solid patterns had a very inferior evenness in density, and therefore bad.

(6) Criteria for Wear Resistance

Cotton was pushed with a load of 500 g and reciprocated 300 rounds on the printed letters of the respective printed samples to rub the letters. Thereafter, the rubbed letters were observed by the naked eyes to check an extent of its remain, and then relatively evaluated in accordance with the following criteria.

◎: Remaining ability of the printed letters was very high, and therefore excellent.

○: Remaining ability of the printed letters was high, and therefore good.

Δ: Though remaining ability of the printed letters was a little inferior, it could be evaluated as almost good.

x: Remaining ability of the printed letters was very inferior, and therefore bad.

(Result)

Results from evaluations of the respective experimental examples are shown in the following Table 1 as well as the applied amount of the peeling layer, the amount ratio of the colorant layer to the peeling layer (colorant layer/peeling layer), the melt viscosity of the peeling layer, the thermoplastic resins contained in the colorant layer, the total proportion (% by weight) of EAA, ionomer, SBR and NBR in the colorant layer, and the proportion (% by weight) of the carboxy-modified SBR.

In TABLE 1, values which are put in parentheses and wrote down with the total proportion of EEA, ionomer, SBR and NBR are proportions of the carboxy-modified SBR contained in the colorant layers.

TABLE 1(1/2)

| | Applied Amount of Peeling Layer ($g/m^2$) | Amount Ratio (Colorant Layer/ Peeling Layer) | Melt Vis-cosity (cP) | Thermoplastic Resin in Colorant Layer | Total Proportion of EAA, Ionomer SBR and NBR (w/w %) *: C-Mod SBR |
|---|---|---|---|---|---|
| | | | Examples | | |
| 1 | 4.5 | 1/15 | 15 | Ionomer, EVA | 22 |
| 2 | 3 | 1/3 | 30 | EEA, NBR, EVA | 53 |
| 3 | 3 | 1/3 | 100 | EAA, SBR, EVA | 67 |
| 4 | 3 | 1/3 | 100 | EAA, C-Mod SBR, EVA | 25 (18)* |
| 5 | 3 | 1/3 | 100 | EAA, C-Mod SBR, EVA | 33 (24)* |
| 6 | 3 | 1/3 | 100 | EAA, C-Mod SBR, EVA | 44 (32)* |
| 7 | 3 | 1/3 | 100 | EAA, C-Mod SBR, EVA | 53 (43)* |
| | | | Comparative Examples | | |
| 1 | 1 | 2/1 | 100 | EAA, EVA | 44 |
| 2 | 6 | 1/6 | 100 | EAA, Ionomer, EVA | 51 |
| 3 | 3 | 1/30 | 100 | EAA, Ionomer, EVA | 51 |
| 4 | 2 | 1/1 | 5 | EAA, EVA | 5 |
| 5 | 3 | 1/3 | 250 | EVA | 55 |
| 6 | 3 | 1/3 | 400 | Polyester | 50 |

TABLE 1(2/2)

| | Transfer-ability | Void | Printing Density | Sharpness of Transfer-stop | Uneveness of Density | Wear Resistance |
|---|---|---|---|---|---|---|
| | | | Examples | | | |
| 1 | ○ | ○ | Δ | ◎ | ○ | ○ |
| 2 | ◎ | ○ | ◎ | ○ | ◎ | ○ |
| 3 | ◎ | ○ | ◎ | Δ | ◎ | ○ |
| 4 | ◎ | ○ | ◎ | ◎ | ◎ | ◎ |
| 5 | ◎ | ◎ | ◎ | ◎ | ◎ | ◎ |
| 6 | ◎ | ◎ | ◎ | ◎ | ◎ | ◎ |
| 7 | ○ | ◎ | ◎ | ○ | ◎ | ◎ |
| | | | Comparative Examples | | | |
| 1 | X | X | ◎ | ◎ | ○ | X |
| 2 | X | Δ | ◎ | X | ◎ | Δ |
| 3 | ○ | ○ | X | ◎ | X | ○ |
| 4 | Δ | Δ | ◎ | Δ | Δ | ○ |
| 5 | ○ | Δ | ○ | ○ | ◎ | ◎ |
| 6 | Δ | Δ | ○ | Δ | ○ | ◎ |

We claim:

1. A thermal transfer sheet comprising a substrate, a peeling layer and a colorant layer, the peeling layer and the colorant layer being disposed on one side of the substrate in this order when viewing from the substrate, wherein an applied amount of the peeling layer is in a range of 1.5 $g/m^2$ to 5.0 $g/m^2$, an applied amount of the colorant layer is not more than half the applied amount of the peeling layer, the peeling layer has a melt viscosity in a range of 10 cP to 300 cP at 100° C., and the colorant layer contains at least one thermoplastic resin selected from the group consisting of ethylene-acrylic acid copolymers, ionomer, styrene-butadiene rubbers, and nitrile-butadiene rubbers at a proportion in a range of 10 to 60% by weight.

2. A thermal transfer sheet as claimed in claim 1, wherein said peeling layer has a melt viscosity in a range of 20 cP to 150 cP at 100° C.

3. A thermal transfer sheet as claimed in claim 1, wherein said colorant layer contains at least one of carboxy-modified styrene-butadiene rubbers as the styrene-butadiene rubbers.

4. A thermal transfer sheet as claimed in claim 3, wherein said carboxy-modified styrene-butadiene rubber is contained in the colorant layer at a proportion in a range of 20 to 40% by weight.

5. A thermal transfer sheet as claimed in claim 1, wherein said colorant layer contains at least one of the ethylene-acrylic acid copolymers and at least one of the styrene-butadiene rubbers at a total proportion in a range of 10 to 60% by weight.

6. A thermal transfer sheet as claimed in claim 5, wherein said colorant layer contains at least one of carboxy-modified styrene-butadiene rubbers as the styrene-butadiene rubbers.

7. A thermal transfer sheet as claimed in claim 6, wherein said carboxy-modified styrene-butadiene rubber is contained in the colorant layer at a proportion in a range of 20 to 40% by weight.

8. A thermal transfer sheet as claimed in claim 1, wherein the applied amount of the colorant layer is not less than one twentieth of the applied amount of the peeling layer.

9. A thermal transfer sheet as claimed in claim 1, wherein said peeling layer comprises at least one selected from the group consisting of waxes and thermoplastic resins.

10. A thermal transfer sheet as claimed in claim 9, wherein said peeling layer comprises-a wax having a melting point in a range of 50 to 85° C.

11. A thermal transfer sheet as claimed in claim 9, wherein said peeling layer comprises a thermoplastic resin having a softening point in a range of 50 to 80° C.

12. A thermal transfer sheet as claimed in claim 1, wherein said colorant layer comprises a colorant in a range of 90 to 20% by weight and a binder in a range of 80 to 10% by weight.

13. A thermal transfer sheet as claimed in claim 12, wherein the binder of the colorant layer comprises at least one selected from the group consisting of waxes and thermoplastic resins.

14. A thermal transfer sheet as claimed in claim 13, wherein the binder of the colorant layer comprises a wax having a melting point in a range of 50 to 85° C.

* * * * *